US011216396B2

(12) United States Patent
Schmisseur et al.

(10) Patent No.: US 11,216,396 B2
(45) Date of Patent: Jan. 4, 2022

(54) PERSISTENT MEMORY WRITE SEMANTICS ON PCIE WITH EXISTING TLP DEFINITION

(71) Applicant: Intel Corporation, Santa Clara, CA (US)

(72) Inventors: Mark A. Schmisseur, Phoenix, AZ (US); Raj K. Ramanujan, Federal Way, WA (US); Filip Schmole, Portland, OR (US); David M. Lee, Portland, OR (US); Ishwar Agarwal, Hillsboro, OR (US); David J. Harriman, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 899 days.

(21) Appl. No.: 15/280,730

(22) Filed: Sep. 29, 2016

(65) Prior Publication Data

US 2018/0089115 A1    Mar. 29, 2018

(51) Int. Cl.
*G06F 13/16* (2006.01)
*G06F 13/42* (2006.01)
*G06F 12/02* (2006.01)
*G06F 12/12* (2016.01)

(52) U.S. Cl.
CPC ...... *G06F 13/1694* (2013.01); *G06F 13/4282* (2013.01); *G06F 12/0246* (2013.01); *G06F 12/12* (2013.01)

(58) Field of Classification Search
None
See application file for complete search history.

(56) References Cited

U.S. PATENT DOCUMENTS 8,266,383 B1 *   9/2012   Minkin ............... G06F 12/0859
                                                        710/39
2013/0173834 A1 * 7/2013   Glaser ................ G06F 12/0802
                                                        710/308
(Continued)

FOREIGN PATENT DOCUMENTS

WO       2016048592 A1      3/2016

OTHER PUBLICATIONS

International Preliminary Report on Patentability issued in International Application No. PCT/US2017/051947, dated Apr. 2, 2019; 12 pages.
(Continued)

*Primary Examiner* — Henry Tsai
*Assistant Examiner* — Christopher A Bartels
(74) *Attorney, Agent, or Firm* — Alliance IP, LLC

(57) ABSTRACT

Aspects of the disclosure are directed to systems, methods, and devices that include an application processor. The application processor includes an interface logic to interface with a communication module using a bidirectional interconnect link compliant with a peripheral component interconnect express (PCIe) protocol. The interface logic to receive a data packet from across the link, the data packet comprises a header and data payload; determine a hint bit set in the header of the data packet; determine a steering tag value in the data packet header based on the hint bit set; and transmit the data payload to non-volatile memory based on the steering tag set in the header.

20 Claims, 11 Drawing Sheets

(56) References Cited

U.S. PATENT DOCUMENTS

| | | | |
|---|---|---|---|
| 2013/0198312 A1* | 8/2013 | Tamir | G06F 21/44 709/212 |
| 2013/0282965 A1 | 10/2013 | Sengupta et al. | |
| 2013/0346655 A1* | 12/2013 | Glaser | G06F 13/385 710/105 |
| 2014/0136786 A1 | 5/2014 | Carpenter et al. | |
| 2014/0201400 A1* | 7/2014 | Beel | H04L 12/1822 710/63 |
| 2014/0223103 A1 | 8/2014 | Rudelic et al. | |
| 2014/0281106 A1* | 9/2014 | Saghi | G06F 13/4036 710/313 |
| 2014/0304475 A1* | 10/2014 | Ramanujan | G06F 12/0895 711/128 |
| 2016/0179738 A1* | 6/2016 | Guddeti | G06F 13/24 714/56 |
| 2018/0088978 A1* | 3/2018 | Li | G06F 13/28 |
| 2018/0279429 A1* | 9/2018 | Sadwick | H05B 45/3725 |
| 2018/0317826 A1* | 11/2018 | Muhsin | G06F 13/385 |
| 2019/0176837 A1* | 6/2019 | Williams | B60W 50/02 |
| 2020/0050505 A1* | 2/2020 | Guo | G11C 29/023 |

OTHER PUBLICATIONS

IBM et al. 'TLP Processing Hints' PCI-SIG Engineering Change Notice, Sep. 11, 2008, pp. 1-16.
International Search Report and Written Opinion in International Application No. PCT/US2017/051947, dated Dec. 15, 2017, 13 pages.

* cited by examiner

PERSISTENT MEMORY WRITE SEMANTICS ON PCIE WITH EXISTING TLP DEFINITION

FIELD

This disclosure pertains to computing system, and in particular (but not exclusively) to persistent memory write semantics on PCIe with an existing TLP definition.

BACKGROUND

System memory can be implemented using volatile memory (e.g. DRAM) where it is expected that data is lost when power is removed. A key semantic for writing to nonvolatile memory is for the source of the write data to be able to know when the data is persistent, and protected from loss of power. For an IO device, communicating this information involves communicating across PCIe. There currently does not exist a standard model for how an IO device would communicate to a target subsystem to achieve the guarantee of write data being persistent.

DETAILED DESCRIPTION

Figure 1:
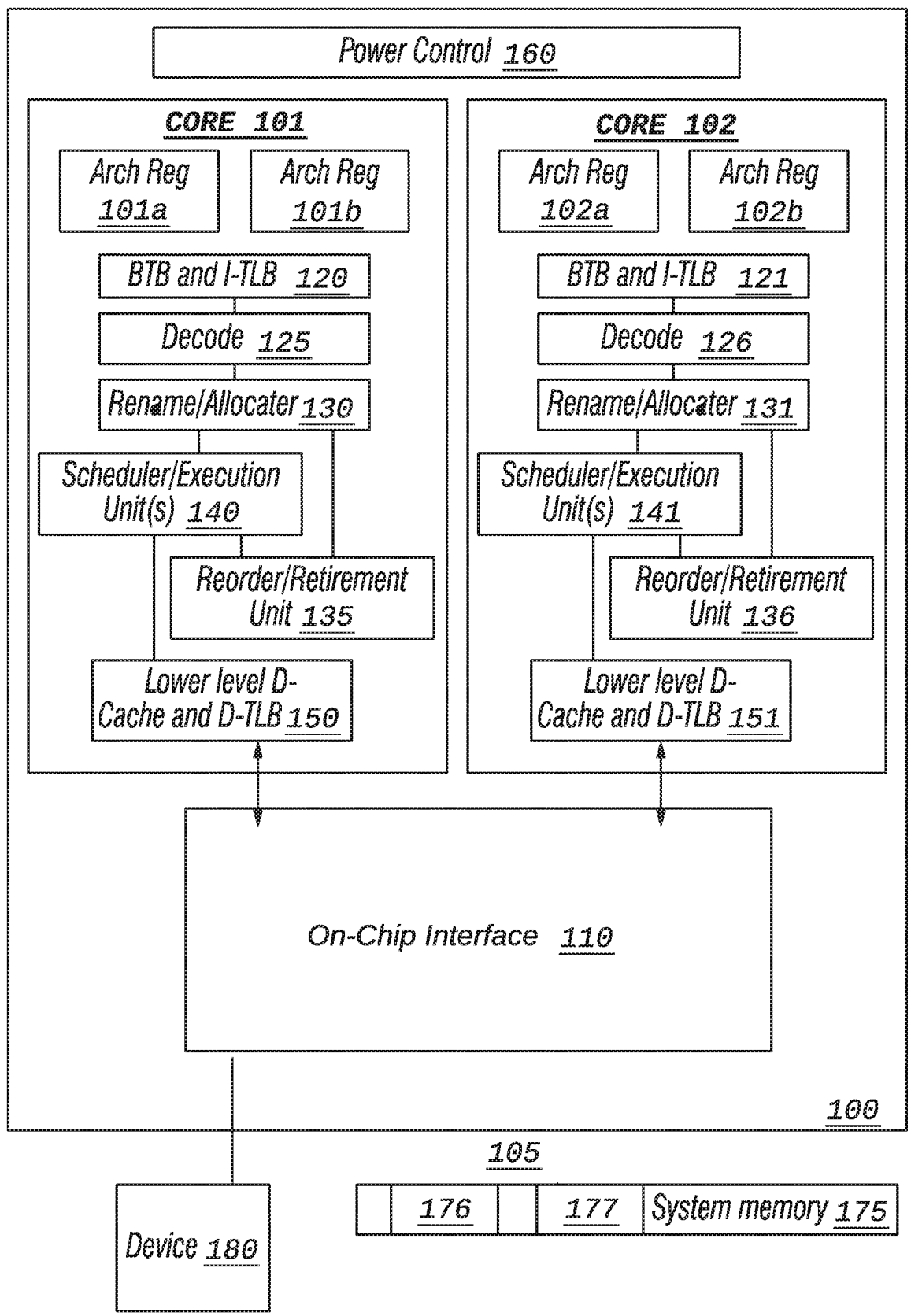
FIG. 1 illustrates an embodiment of a block diagram for a computing system including a multicore processor.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it is a singular purpose of most fabrics to provide highest possible performance with maximum power saving. Below, a number of interconnects are discussed, which would potentially benefit from aspects of the invention described herein.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101*a* and 101*b*, which may also be referred to as hardware thread slots 101*a* and 101*b*. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101*a*, a second thread is associated with architecture state registers 101*b*, a third thread may be associated with architecture state registers 102*a*, and a fourth thread may be associated with architecture state registers 102*b*. Here, each of the architecture state registers (101*a*, 101*b*, 102*a*, and 102*b*) may be referred to as processing elements, thread slots, or thread units, as described above. As illustrated, architecture state registers 101*a* are replicated in architecture state registers 101*b*, so individual architecture states/contexts are capable of being stored for logical processor 101*a* and logical processor 101*b*. In core 101, other smaller resources, such as instruction pointers and renaming logic in allocator and renamer block 130 may also be replicated for threads 101*a* and 101*b*. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101*a*, 101*b*, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files to store instruction processing results. However, threads 101*a* and 101*b* are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 11 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

With high performance non-volatile memory (NVM) solutions being incorporated into systems, and new NVM technologies bringing NVM to system memory, access to the non-volatile memory from IO sources is desired. This disclosure describes an input/output device (TO device) that can communicate with a target subsystem to identify write data being persistent.

This disclosure takes advantage of existing PCIe header fields to communicate transactions to be decoded by a root complex or target peer device to meet the persistent memory guarantees. The guarantee indicates that writes to persistent memory are complete only when the written data is safe from system power failure. With the special use of PCIe header fields, an IO device can use posted write transactions over PCIe to write data to non-volatile memory (NVM) within the root complex and follow it with a transaction that completes confirming the write data is persistent.

A root complex can define memory address ranges that target NVM; however, doing so can be limited in flexibility and scalability for number of memory ranges that may be allocated and deallocated dynamically while a system is running. Also, using memory address ranges as the only way to associate operations with NVM or volatile memory may cause unwanted performance penalties.

This disclosure allows individual write transactions to any address to be processed by the root complex (or another PCIe IO port, memory controller, CPU agent, etc.) as a write to persistent memory, improving flexibility and performance. There is no limit on address ranges to be decoded. The systems, methods, and apparatuses described herein can be used in conjunction with hints for write data to be optionally cached, or relaxed in order relative to prior writes.

Figure 2:
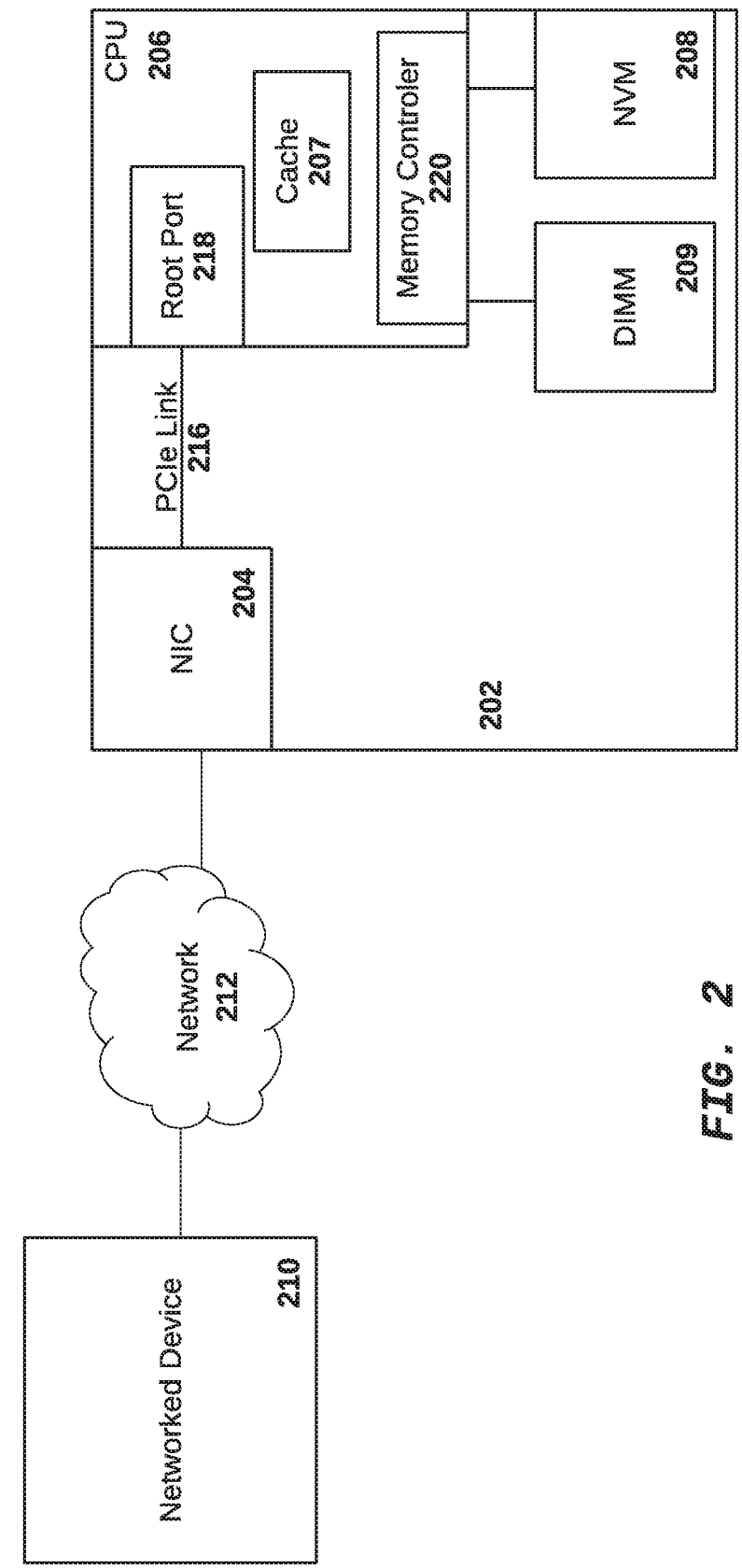
FIG. 2 is a schematic diagram of an example computing system in accordance with embodiments of the present disclosure.

FIG. 2 is a schematic diagram of an example computing system 200 in accordance with embodiments of the present disclosure. The computing system 200 can be similar to that shown in FIG. 6. In FIG. 2, a networked device 210 is in communication with a computing system 202 across a network 212. Networked device 210 can send and receive data packets across the network 212. Computing system 202 can also send and receive packets across network 212. For example, computing system 202 can receive packets from the networked device 210 through a network interface controller (NIC) 204. The NIC 204 can be, for example, a remote direct memory access (RDMA) NIC (RNIC). Packets that include write requests to memory 208 can be processed by the CPU 206 to access non-volatile memory 208 and bypass volatile memory 209 and/or cache memory 207.

The NIC 204 can be connected to a CPU 206 by a PCIe link 216. Packets received by the NIC 204 can be compatible with the PCIe protocols. The CPU 206 can handle data packets containing data to be written to volatile memory and can handle data packets with data to be written to persistent, or non-volatile memory. For example, a root complex 218 associated with the CPU 206 can be configured to differentiate packets with write data to non-volatile memory from packets with write data to volatile memory 207. The root complex 218 can use a transaction layer packet (TLP) processing hint (TPH) capability that includes a steering tag (ST) in the packet header to determine that the packet data should be stored in the non-volatile memory 208, and in some cases, should bypass cache memory 207.

With this capability, the network device 210 as initiator of the write commands can execute an access model with knowledge of when write data will guaranteed to be persistent. To complete the guarantee, the initiator must complete two operations:

1. Write data to root complex 218 with that includes a persistent memory indicator; and
2. Perform a flushing read operation to the root complex when a guarantee of the prior write completions is required (i.e., to obtain a guarantee that write transactions were executed on nonvolatile memory.

Figure 3:
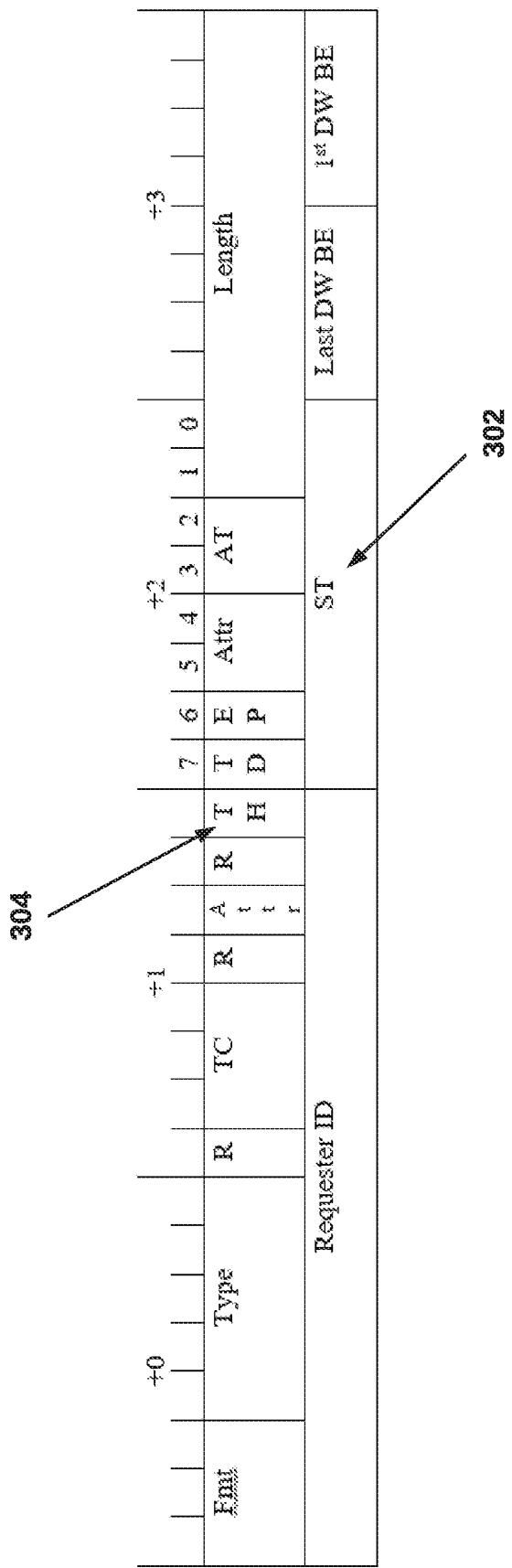
FIG. 3 is a schematic diagram of a PCIe header with an example steering tag field 302 in accordance with embodiments of the present disclosure.

FIG. 3 is a schematic diagram of a PCIe header 300 with an example steering tag field 302 in accordance with embodiments of the present disclosure. The PCIe specification defines an extended capability for providing the root complex additional routing indicators. The TLP Processing Hint (TPH) capability includes a Steering Tag (ST) 302 field to direct write data routing (e.g., to non-volatile memory). The TH bit 304 of the header is set to 1 to indicate the header is TPH enabled. FIG. 3 highlights these fields within an example PCIe write header.

TLP Processing Hints can improve memory latency by associating a packet with a given processor cache (perhaps this is a little like processor affinity). The TH bit 304 in the header 300 indicates that hints are present (e.g., a TH bit 304 set to 1 indicates that the header is TPH enabled). The hint is contained in the last 2 bits of the address field that used to be reserved. The 2 hint bits indicate frequent read/write access to data:

i. 00—Bidirectional: by both host and device
  ii. 01—Requester: by device
  iii. 10—Target (Completer): by host
  iv. 11—Target with priority: by host with high temporal locality (using the local cache as much as possible)

Steering Tag (ST) bits 302 are system-specific values that indicate a processing resource is being explicitly targeted by a Requester. For posted writes, the 8-bit tag field is repurposed for the ST field 302.

The PCIe device uses an agreed to ST value that the root complex will decode for writes to persistent memory. This value can be a predefined fixed value such as FFh, or could be a programmed value. The device driver can inquire from the platform that the TPH capability is supported and what ST value is used for PM decode. The device driver can then enable writes to PM in the IO device and program the ST value for use with any write to persistent memory.

In some embodiments, an extended steering tag can be used in the header (e.g., a steering tag that includes an additional 8 bits, for a 16 bit ST). The header can include an additional DWORD in a TLP (e.g., a TLP prefix) that can include 8 additional ST field bits.

Figure 4A:
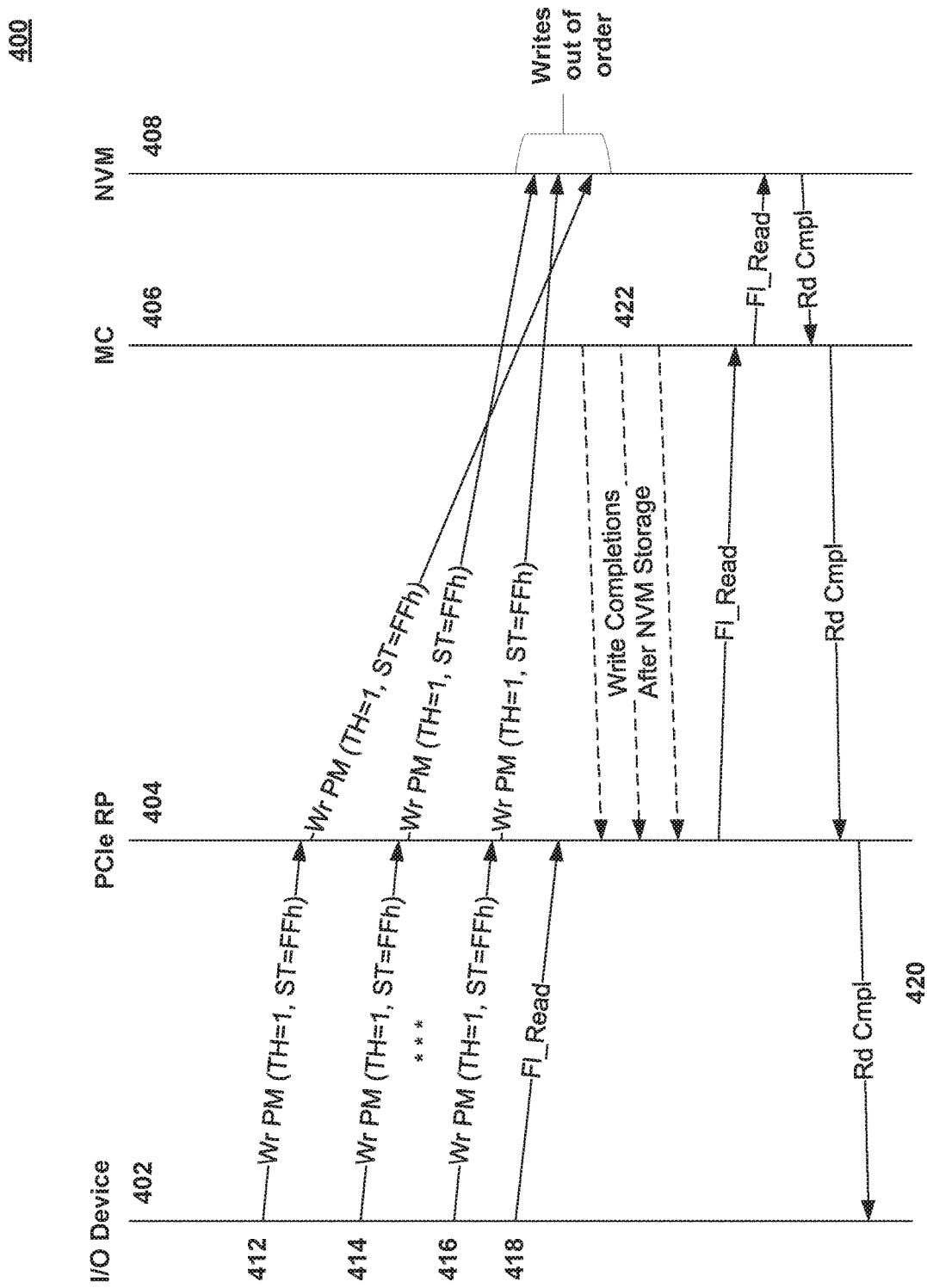
FIG. 4A is a schematic diagram of memory write accesses in accordance with embodiments of the present disclosure.

FIG. 4A is a schematic diagram 400 of memory write accesses in accordance with embodiments of the present disclosure. FIG. 4A illustrates the sequence the IO device 402 would follow to write to persistent memory 408 and receive a guarantee of persistence. In the example shown in FIG. 4A, the IO device 402 can send a series of writes 412-416 intended for persistent memory 408, as indicated by the header fields set accordingly (TH=1 and ST=FF). Note that hints for caching and relaxed ordering may also be set and are not shown.

Once a write transaction has been received by the PCI root port 404, and is in the root complex 404, the header bits in the packets are decoded by the root port 404 and the write is sent to the memory controller (MC) 406. The writes 412-416 may be placed in non-volatile memory 408 in order or out of order without deviating from the disclosure. After the writes are issued, the IO device 402 sends a read request which performs as a flushing read. The PCIe root port 404 does not process the read 418 until after all preceding writes have completed. Given the writes 412-416 were to NVM 408, the writes 412-416 will not complete until they are persistent. The read completion 420 is returned by the root port 404 after the prior writes are complete, and the IO device 402 now is guaranteed the prior writes are now persistent. The read completion 420 can be considered as a guarantee of write completions to persistent memory.

Figure 4B:
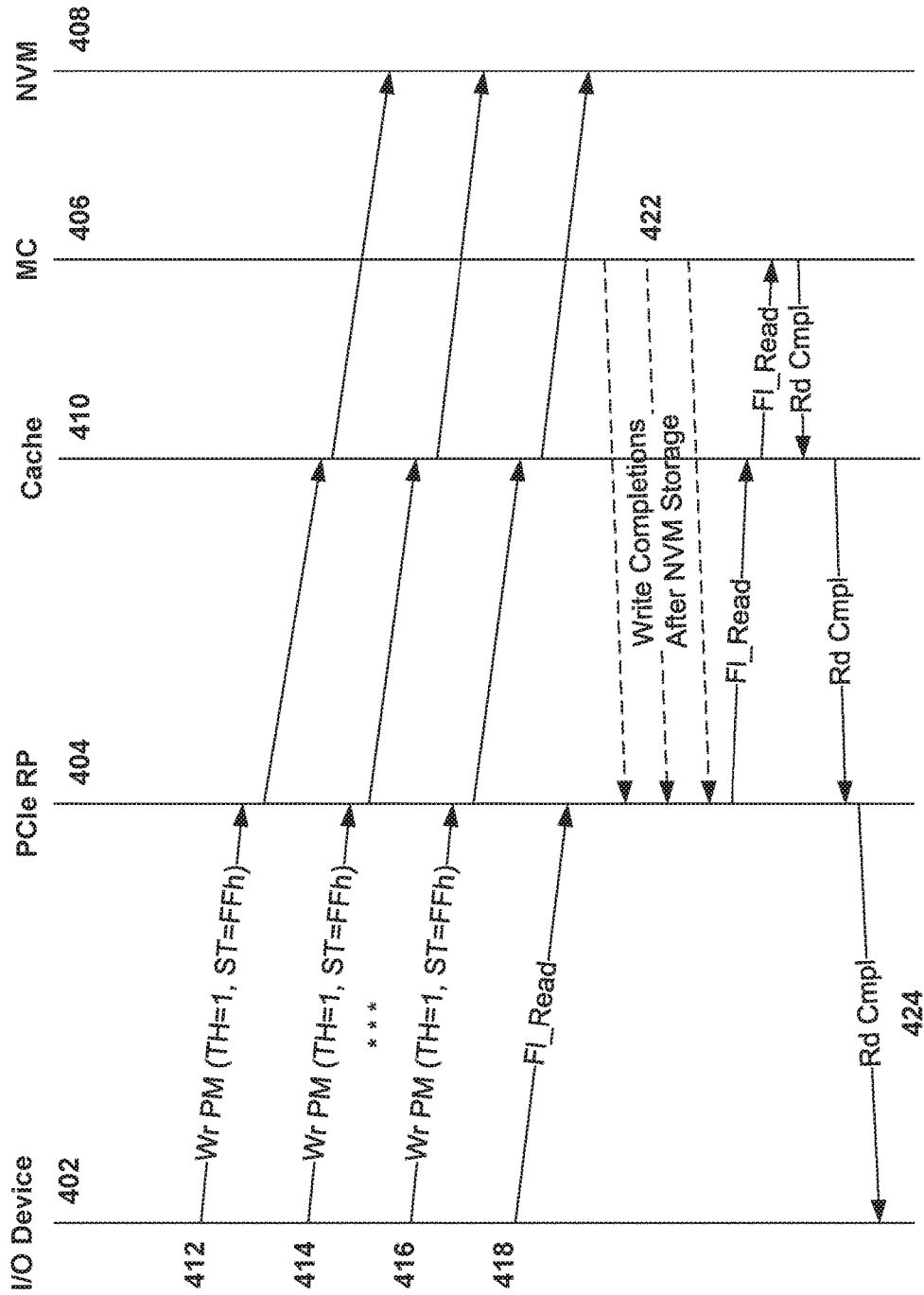
FIG. 4B is a schematic diagram of memory write accesses in accordance with embodiments of the present disclosure.

FIG. 4B is a schematic diagram 450 of memory write transactions in accordance with embodiments of the present disclosure. In FIG. 4B, the data incoming to the root port 404 can be cached prior to being stored in non-volatile memory 408. In embodiments, the data packet header can include a cache hint. The PCIe root complex 404 can process the cache hint to store the data packet payload into cache memory 410 prior to being stored in non-volatile memory 408.

The flushing read 418 can be processed by the PCIe root complex 404 in a similar way as described above. The read completion 424 can be processed from the cache memory 410 after the PCIe root port 404 receives write completions 422 from memory controller 406. The read completion 424 can be considered as a guarantee of write completions to persistent memory.

Figure 5:
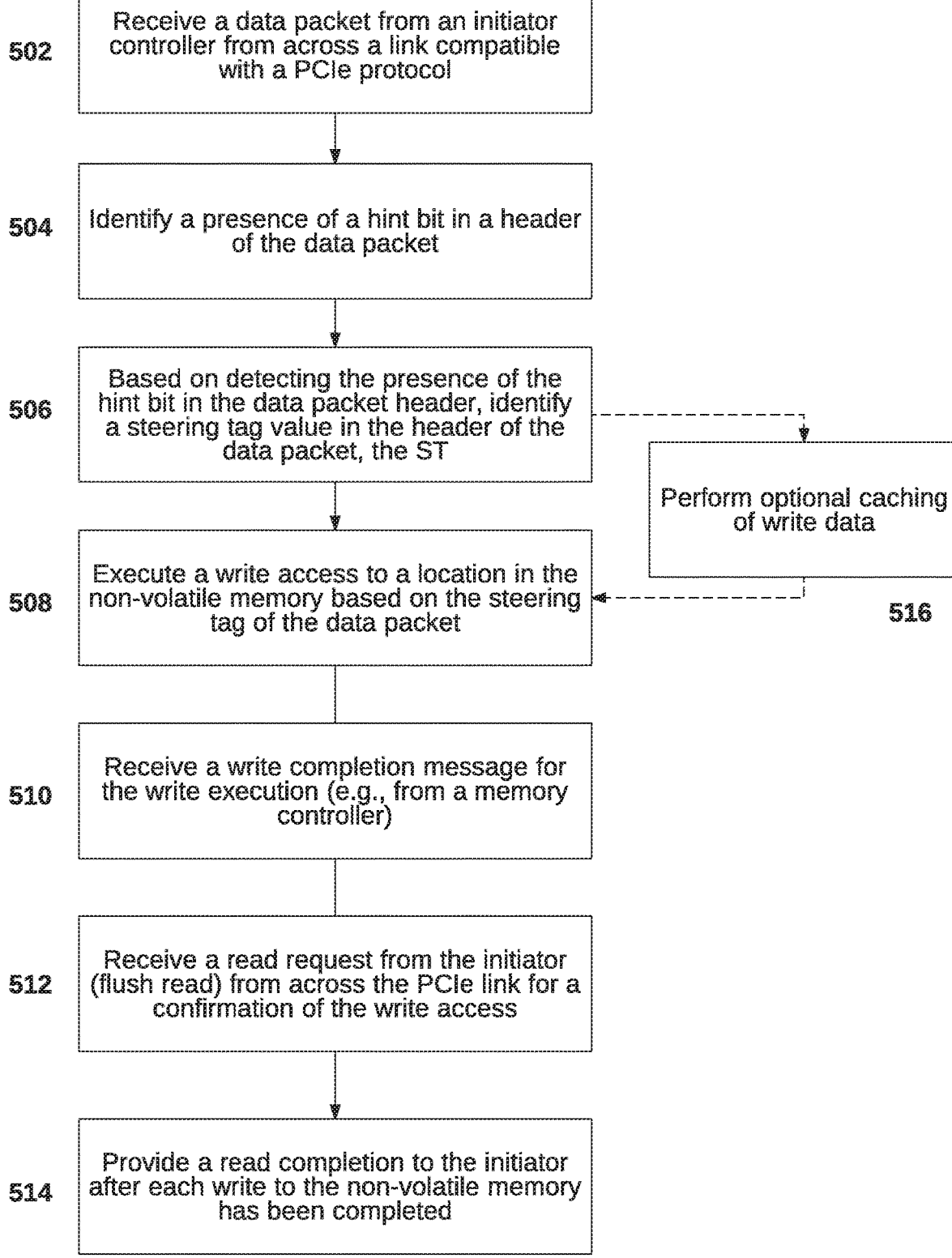
FIG. 5 is a process flow diagram for writing to nonvolatile memory in accordance with embodiments of the present disclosure.

FIG. 5 is a process flow diagram 500 for writing to non-volatile memory in accordance with embodiments of the present disclosure. One or more data packets can be received at an PCIe compatible port of a CPU from an initiator of a data packet write request across a data link compatible with a PCIe protocol (502) (e.g., the data packet can be routed to a port through a network interface controller). Each data packet can include a write request to non-volatile memory. The port can be a root port. The port can decode a header of the data packet to identify the presence of a hint bit set in the data header (504). For example, the port can determine that the TH bit in the data packet is set. Based on determining that the TH bit is set, the port can determine a steering tag value for direct write access to non-volatile memory (506). The port can execute a write access to non-volatile memory based on the value of the steering tag in the data packet header (508). In some embodiments, the port can optionally cache the data for the write request (516). The port can receive a write completion from a memory controller for each of the write accesses requested by the initiator (510). The port can receive a read request from the initiator, which the port can interpret as a flush read (512). The port can transmit a read completion to the initiator based on receiving a write completion for all write access completions (514). The port can delay transmission of a read completion message until each write request from the initiator has been completed.

Figure 6:
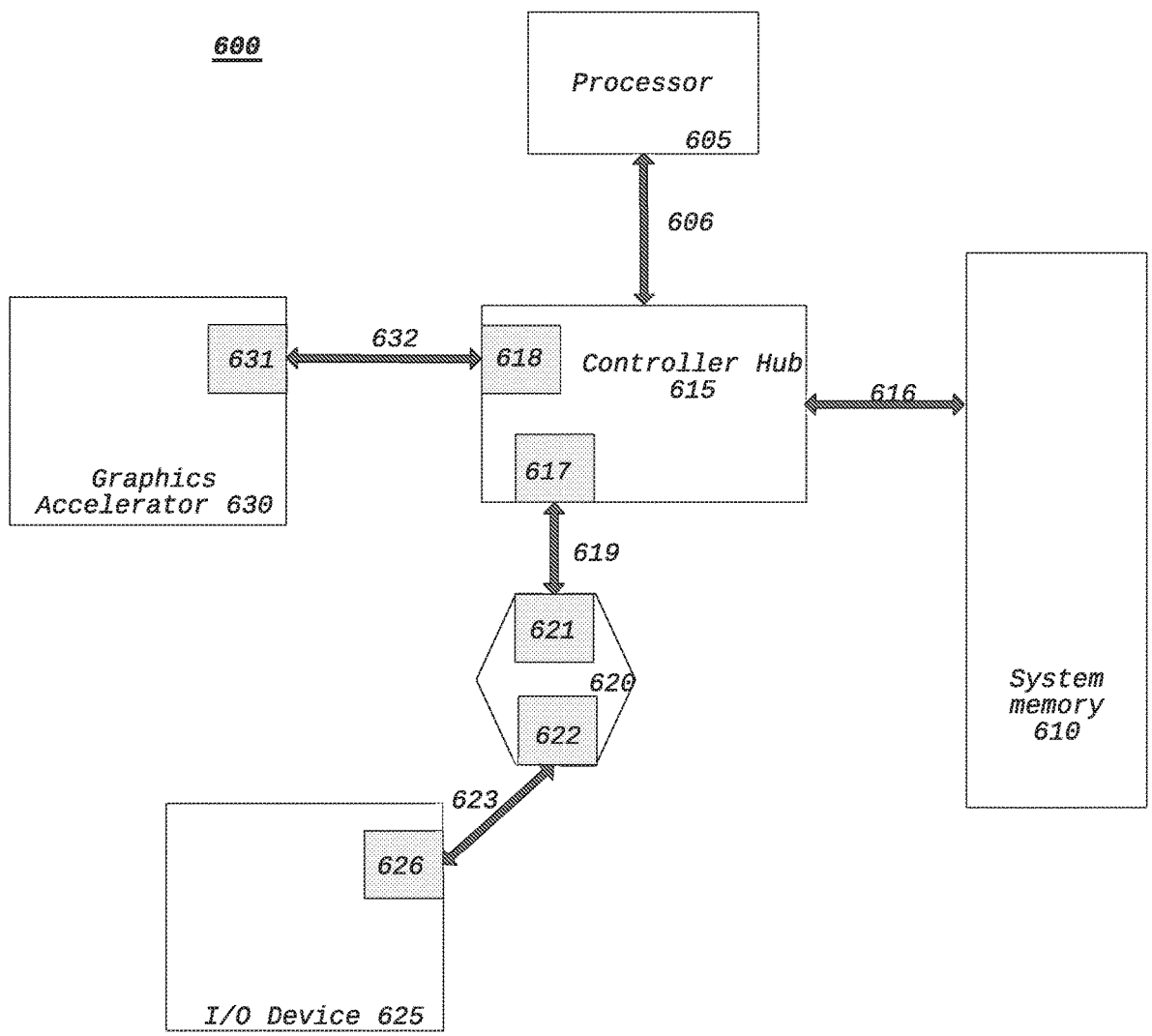
FIG. 6 illustrates an embodiment of a computing system including an interconnect architecture in accordance with embodiments of the present disclosure.

Referring to FIG. 6, an embodiment of a fabric composed of point-to-point Links that interconnect a set of components is illustrated. System 600 includes processor 605 and system memory 610 coupled to controller hub 615. Processor 605 includes any processing element, such as a microprocessor, a host processor, an embedded processor, a co-processor, or other processor. Processor 605 is coupled to controller hub 615 through front-side bus (FSB) 606. In one embodiment, FSB 606 is a serial point-to-point interconnect as described below. In another embodiment, link 606 includes a serial, differential interconnect architecture that is compliant with different interconnect standard.

System memory 610 includes any memory device, such as random access memory (RAM), non-volatile (NV) memory, or other memory accessible by devices in system 600. System memory 610 is coupled to controller hub 615 through memory interface 616. Examples of a memory interface include a double-data rate (DDR) memory interface, a dual-channel DDR memory interface, and a dynamic RAM (DRAM) memory interface.

In one embodiment, controller hub 615 is a root hub, root complex, or root controller in a Peripheral Component Interconnect Express (PCIe or PCIE) interconnection hierarchy. The controller 615 can set a register bit to define a number of duplicate ACK DLLPs to transmit upon successful reception of a PTM Request message. The register bit can be changed dynamically based on link quality and/or processing overhead. For example, for a link that is of a high quality, as characterized by a low incidence of ACK DLLP corruptions (or characterized by other quality properties), the number of duplicate ACK DLLPs can be reduced. For poor link qualities, the duplicate ACK DLLPs can be increased.

Examples of controller hub 615 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 605, while controller 615 is to communicate with I/O devices, in a similar manner as described below. In some embodiments, peer-to-peer routing is optionally supported through root complex 615.

Here, controller hub 615 is coupled to switch/bridge 620 through serial link 619. Input/output modules 617 and 621, which may also be referred to as interfaces/ports 617 and 621, include/implement a layered protocol stack to provide communication between controller hub 615 and switch 620. In one embodiment, multiple devices are capable of being coupled to switch 620.

Switch/bridge 620 routes packets/messages from device 625 upstream, i.e. up a hierarchy towards a root complex, to controller hub 615 and downstream, i.e. down a hierarchy away from a root controller, from processor 605 or system memory 610 to device 625. Switch 620, in one embodiment, is referred to as a logical assembly of multiple virtual PCI-to-PCI bridge devices. Device 625 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 625 may include a PCIe to PCI/PCI-X bridge to support legacy or other version PCI devices. Endpoint devices in PCIe are often classified as legacy, PCIe, or root complex integrated endpoints.

Graphics accelerator 630 is also coupled to controller hub 615 through serial link 632. In one embodiment, graphics accelerator 630 is coupled to an MCH, which is coupled to an ICH. Switch 620, and accordingly I/O device 625, is then coupled to the ICH. I/O modules 631 and 618 are also to implement a layered protocol stack to communicate between graphics accelerator 630 and controller hub 615. Similar to the MCH discussion above, a graphics controller or the graphics accelerator 630 itself may be integrated in processor 605.

Figure 7:
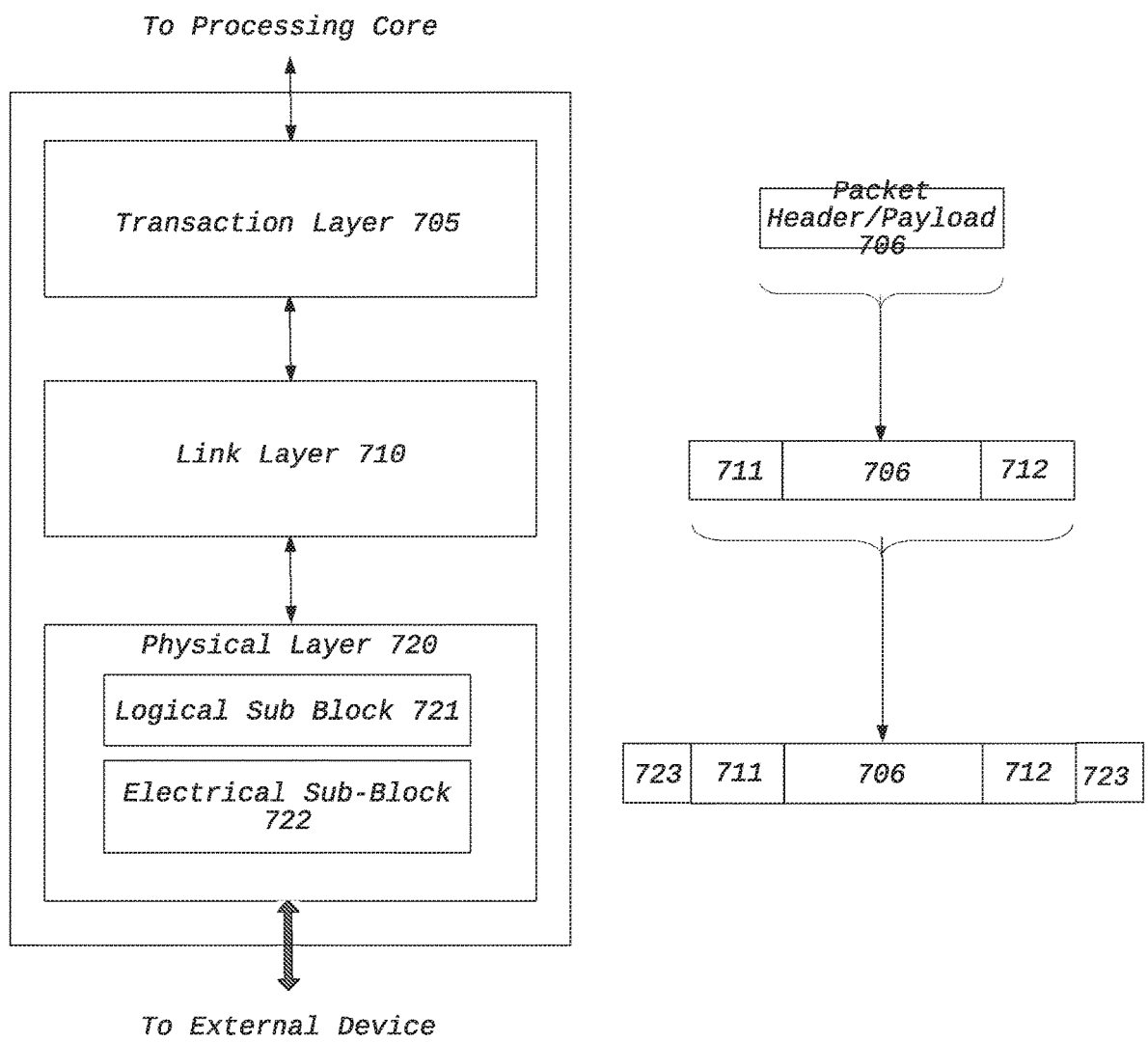
FIG. 7 illustrates an embodiment of a interconnect architecture including a layered stack in accordance with embodiments of the present disclosure.

Turning to FIG. 7 an embodiment of a layered protocol stack is illustrated. Layered protocol stack 700 includes any form of a layered communication stack, such as a Quick Path Interconnect (QPI) stack, a PCIe stack, a next generation high performance computing interconnect stack, or other layered stack. Although the discussion immediately below in reference to FIGS. 6-11 are in relation to a PCIe stack, the same concepts may be applied to other interconnect stacks. In one embodiment, protocol stack 700 is a PCIe protocol stack including transaction layer 705, link layer 710, and physical layer 720. An interface, such as interfaces 617, 618, 621, 622, 626, and 631 in FIG. 6, may be represented as communication protocol stack 700. Representation as a communication protocol stack may also be referred to as a module or interface implementing/including a protocol stack.

PCI Express uses packets to communicate information between components. Packets are formed in the Transaction Layer 705 and Data Link Layer 710 to carry the information from the transmitting component to the receiving component. As the transmitted packets flow through the other layers, they are extended with additional information necessary to handle packets at those layers. At the receiving side the reverse process occurs and packets get transformed from their Physical Layer 720 representation to the Data Link Layer 710 representation and finally (for Transaction Layer Packets) to the form that can be processed by the Transaction Layer 705 of the receiving device.

Transaction Layer

In one embodiment, transaction layer 705 is to provide an interface between a device's processing core and the interconnect architecture, such as data link layer 710 and physical layer 720. In this regard, a primary responsibility of the transaction layer 705 is the assembly and disassembly of packets (i.e., transaction layer packets, or TLPs). The translation layer 705 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 705. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 705 assembles packet header/payload 706. Format for current packet headers/payloads may be found in the PCIe specification at the PCIe specification website.

Figure 8:
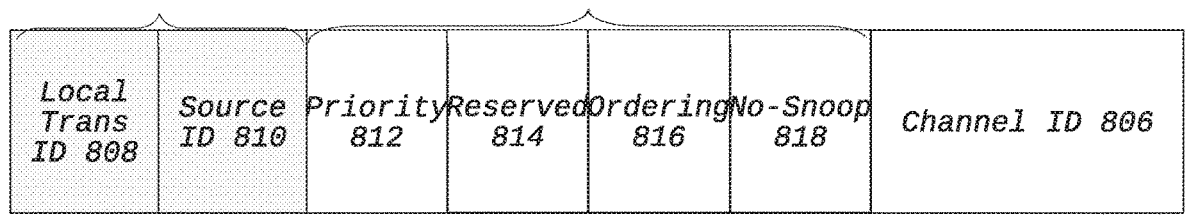
FIG. 8 illustrates an embodiment of a request or packet to be generated or received within an interconnect architecture in accordance with embodiments of the present disclosure.

Briefly referring to FIG. 8, an embodiment of a PCIe transaction descriptor is illustrated. In one embodiment, transaction descriptor 800 is a mechanism for carrying transaction information. In this regard, transaction descriptor 800 supports identification of transactions in a system. Other potential uses include tracking modifications of default transaction ordering and association of transaction with channels.

Transaction descriptor 800 includes global identifier field 802, attributes field 804 and channel identifier field 806. In the illustrated example, global identifier field 802 is depicted comprising local transaction identifier field 808 and source identifier field 810. In one embodiment, global transaction identifier 802 is unique for all outstanding requests.

According to one implementation, local transaction identifier field 808 is a field generated by a requesting agent, and it is unique for all outstanding requests that require a completion for that requesting agent. Furthermore, in this example, source identifier 810 uniquely identifies the requestor agent within a PCIe hierarchy. Accordingly, together with source ID 810, local transaction identifier 808 field provides global identification of a transaction within a hierarchy domain.

Attributes field 804 specifies characteristics and relationships of the transaction. In this regard, attributes field 804 is potentially used to provide additional information that allows modification of the default handling of transactions. In one embodiment, attributes field 804 includes priority field 812, reserved field 814, ordering field 816, and no-snoop field 818. Here, priority sub-field 812 may be modified by an initiator to assign a priority to the transaction. Reserved attribute field 814 is left reserved for future, or vendor-defined usage. Possible usage models using priority or security attributes may be implemented using the reserved attribute field.

In this example, ordering attribute field 816 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 818 is utilized to determine if transactions are snooped. As shown, channel ID Field 806 identifies a channel that a transaction is associated with.

Link Layer

Returning to FIG. 7, link layer 710, also referred to as data link layer 710, acts as an intermediate stage between transaction layer 705 and the physical layer 720. In one embodiment, a responsibility of the data link layer 710 is providing a reliable mechanism for exchanging Transaction Layer Packets (TLPs) between two components a link. One side of the Data Link Layer 710 accepts TLPs assembled by the Transaction Layer 705, applies packet sequence identifier 711, i.e. an identification number or packet number, calculates and applies an error detection code, i.e. CRC 712, and submits the modified TLPs to the Physical Layer 720 for transmission across a physical to an external device.

Physical Layer

In one embodiment, physical layer 720 includes logical sub block 721 and electrical sub-block 722 to physically transmit a packet to an external device. Here, logical sub-block 721 is responsible for the "digital" functions of Physical Layer 721. In this regard, the logical sub-block includes a transmit section to prepare outgoing information for transmission by physical sub-block 722, and a receiver section to identify and prepare received information before passing it to the Link Layer 710.

Physical block 722 includes a transmitter and a receiver. The transmitter is supplied by logical sub-block 721 with symbols, which the transmitter serializes and transmits onto to an external device. The receiver is supplied with serialized symbols from an external device and transforms the received signals into a bit-stream. The bit-stream is de-serialized and supplied to logical sub-block 721. In one embodiment, an 8b/10b transmission code is employed, where ten-bit symbols are transmitted/received. Here, special symbols are used to frame a packet with frames 723. In addition, in one example, the receiver also provides a symbol clock recovered from the incoming serial stream.

As stated above, although transaction layer 705, link layer 710, and physical layer 720 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 9:
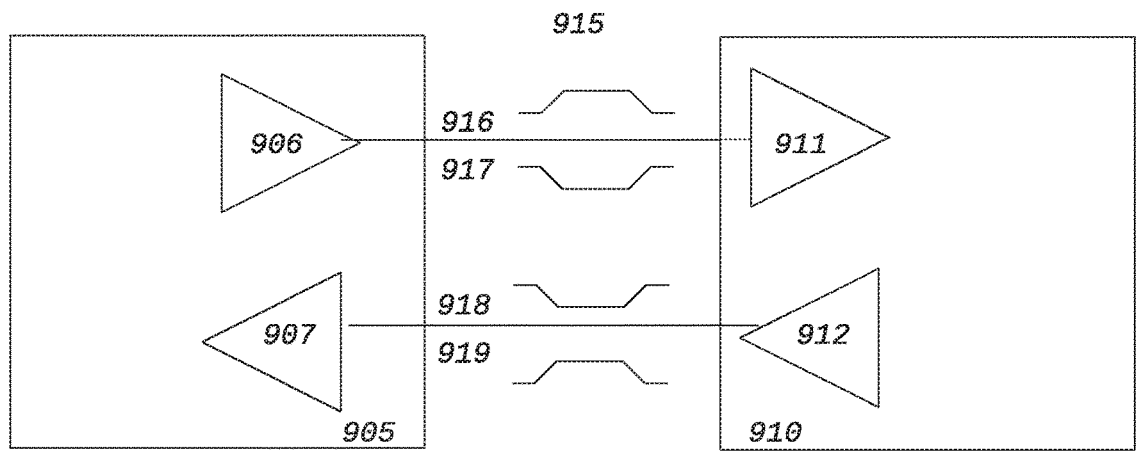
FIG. 9 illustrates an embodiment of a transmitter and receiver pair for an interconnect architecture in accordance with embodiments of the present disclosure.

Referring next to FIG. 9, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 906/911 and a receive pair 912/907. Accordingly, device 905 includes transmission logic 906 to transmit data to device 910 and receiving logic 907 to receive data from device 910. In other words, two transmitting paths, i.e. paths 916 and 917, and two receiving paths, i.e. paths 918 and 919, are included in a PCIe link.

A transmission path refers to any path for transmitting data, such as a transmission line, a copper line, an optical line, a wireless communication channel, an infrared communication link, or other communication path. A connection between two devices, such as device 905 and device 910, is referred to as a link, such as link 415. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

Note that the apparatus', methods', and systems described above may be implemented in any electronic device or system as aforementioned. As specific illustrations, the figures below provide exemplary systems for utilizing the invention as described herein. As the systems below are described in more detail, a number of different interconnects are disclosed, described, and revisited from the discussion above. And as is readily apparent, the advances described above may be applied to any of those interconnects, fabrics, or architectures.

Figure 10:
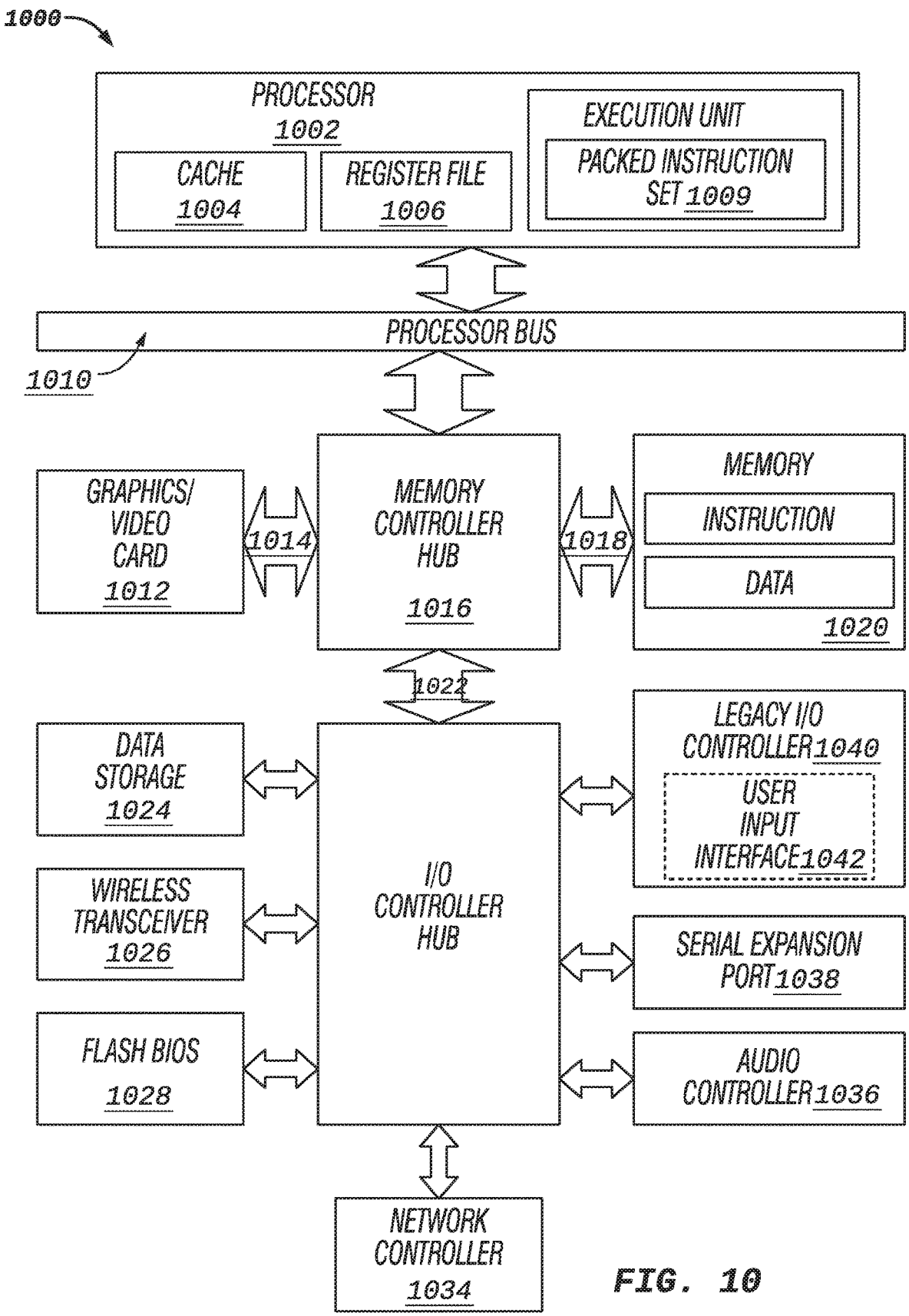
FIG. 10 illustrates another embodiment of a block diagram for a computing system including a processor in accordance with embodiments of the present disclosure.

Turning to FIG. 10, a block diagram of an exemplary computer system formed with a processor that includes execution units to execute an instruction, where one or more of the interconnects implement one or more features in accordance with one embodiment of the present invention is illustrated. System 1000 includes a component, such as a processor 1002 to employ execution units including logic to perform algorithms for process data, in accordance with the present invention, such as in the embodiment described herein. System 1000 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 1000 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

Embodiments are not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 1002 includes one or more execution units 1008 to implement an algorithm that is to perform at least one instruction. One embodiment may be described in the context of a single processor desktop or server system, but alternative embodiments may be included in a multiprocessor system. System 1000 is an example of a 'hub' system architecture. The computer system 1000 includes a processor 1002 to process data signals. The processor 1002, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 1002 is coupled to a processor bus 1010 that transmits data signals between the processor 1002 and other components in the system 1000. The elements of system 1000 (e.g. graphics accelerator 1012, memory controller hub 1016, memory 1020, I/O controller hub 1024, wireless transceiver 1026, Flash BIOS 1028, Network controller 1034, Audio controller 1036, Serial expansion port 1038, I/O controller 1040, etc.) perform their conventional functions that are well known to those familiar with the art.

In one embodiment, the processor 1002 includes a Level 1 (L1) internal cache memory 1004. Depending on the architecture, the processor 1002 may have a single internal cache or multiple levels of internal caches. Other embodiments include a combination of both internal and external caches depending on the particular implementation and needs. Register file 1006 is to store different types of data in various registers including integer registers, floating point registers, vector registers, banked registers, shadow registers, checkpoint registers, status registers, and instruction pointer register.

Execution unit 1008, including logic to perform integer and floating point operations, also resides in the processor 1002. The processor 1002, in one embodiment, includes a microcode (ucode) ROM to store microcode, which when executed, is to perform algorithms for certain macroinstructions or handle complex scenarios. Here, microcode is potentially updateable to handle logic bugs/fixes for processor 1002. For one embodiment, execution unit 1008 includes logic to handle a packed instruction set 1009. By including the packed instruction set 1009 in the instruction set of a general-purpose processor 1002, along with associated circuitry to execute the instructions, the operations used by many multimedia applications may be performed using packed data in a general-purpose processor 1002. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 1008 may also be used in micro controllers, embedded processors, graphics devices, DSPs, and other types of logic circuits. System 1000 includes a memory 1020. Memory 1020 includes a dynamic random access memory (DRAM) device, a static random access memory (SRAM) device, flash memory device, or other memory device. Memory 1020 stores instructions and/or data represented by data signals that are to be executed by the processor 1002.

Note that any of the aforementioned features or aspects of the invention may be utilized on one or more interconnect illustrated in FIG. 10. For example, an on-die interconnect (ODI), which is not shown, for coupling internal units of processor 1002 implements one or more aspects of the invention described above. Or the invention is associated with a processor bus 1010 (e.g. Intel Quick Path Interconnect (QPI) or other known high performance computing interconnect), a high bandwidth memory path 1018 to memory 1020, a point-to-point link to graphics accelerator 1012 (e.g. a Peripheral Component Interconnect express (PCIe) compliant fabric), a controller hub interconnect 1022, an I/O or other interconnect (e.g. USB, PCI, PCIe) for coupling the other illustrated components. Some examples of such components include the audio controller 1036, firmware hub (flash BIOS) 1028, wireless transceiver 1026, data storage 1024, legacy I/O controller 1010 containing user input and keyboard interfaces 1042, a serial expansion port 1038 such as Universal Serial Bus (USB), and a network controller 1034. The data storage device 1024 can comprise a hard disk drive, a floppy disk drive, a CD-ROM device, a flash memory device, or other mass storage device.

Figure 11:
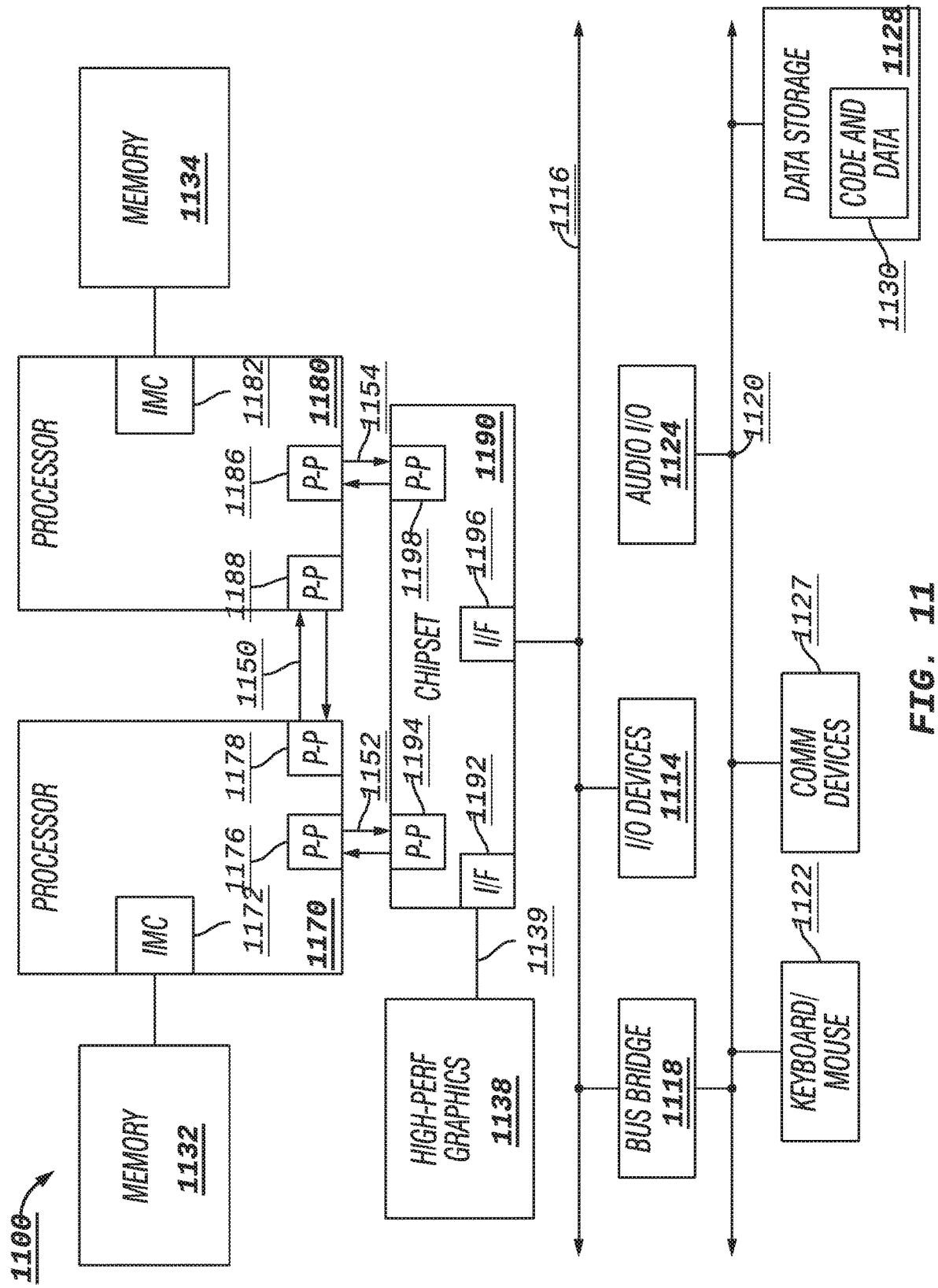
FIG. 11 illustrates an embodiment of a block for a computing system including multiple processor sockets in accordance with embodiments of the present disclosure.

Referring now to FIG. 11, shown is a block diagram of a system 1100 in accordance with an embodiment of the present invention. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of a processor. In one embodiment, 1152 and 1154 are part of a serial, point-to-point coherent interconnect fabric, such as Intel's Quick Path Interconnect (QPI) architecture. As a result, the invention may be implemented within the QPI architecture.

While shown with only two processors 1170, 1180, it is to be understood that the scope of the present invention is not so limited. In other embodiments, one or more additional processors may be present in a given processor.

Processors 1170 and 1180 are shown including integrated memory controller units 1172 and 1182, respectively. Processor 1170 also includes as part of its bus controller units point-to-point (P-P) interfaces 1176 and 1178; similarly, second processor 1180 includes P-P interfaces 1186 and 1188. Processors 1170, 1180 may exchange information via a point-to-point (P-P) interface 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 each exchange information with a chipset 1190 via individual P-P interfaces 1152, 1154 using point to point interface circuits 1176, 1194, 1186, 1198. Chipset 1190 also exchanges information with a high-performance graphics circuit 1138 via an interface circuit 1192 along a high-performance graphics interconnect 1139.

A shared cache (not shown) may be included in either processor or outside of both processors; yet connected with the processors via P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present invention is not so limited.

As shown in FIG. 11, various I/O devices 1114 are coupled to first bus 1116, along with a bus bridge 1118 which couples first bus 1116 to a second bus 1120. In one embodiment, second bus 1120 includes a low pin count (LPC) bus. Various devices are coupled to second bus 1120 including, for example, a keyboard and/or mouse 1122, communication devices 1127 and a storage unit 1128 such as a disk drive or other mass storage device which often includes instructions/code and data 1130, in one embodiment. Further, an audio I/O 1124 is shown coupled to second bus 1120. Note that other architectures are possible, where the included components and interconnect architectures vary. For example, instead of the point-to-point architecture of FIG. 11, a system may implement a multi-drop bus or other such architecture.

In various embodiments, mass storage of the system is implemented by a SSD alone or as a disk, optical or other drive with an SSD cache. In some embodiments, the mass storage is implemented as a SSD or as a HDD along with a restore (RST) cache module. In various implementations, the HDD provides for storage of between 320 GB-4 terabytes (TB) and upward while the RST cache is implemented with a SSD having a capacity of 24 GB-256 GB. Note that such SSD cache may be configured as a single level cache (SLC) or multi-level cache (MLC) option to provide an appropriate level of responsiveness. In a SSD-only option, the module may be accommodated in various locations such as in a mSATA or NGFF slot. As an example, an SSD has a capacity ranging from 120 GB-1 TB.

The display panel may operate in multiple modes. In a first mode, the display panel can be arranged in a transparent state in which the display panel is transparent to visible light. In various embodiments, the majority of the display panel may be a display except for a bezel around the periphery. When the system is operated in a notebook mode and the display panel is operated in a transparent state, a user may view information that is presented on the display panel while also being able to view objects behind the display. In addition, information displayed on the display panel may be viewed by a user positioned behind the display. Or the operating state of the display panel can be an opaque state in which visible light does not transmit through the display panel.

In a tablet mode the system is folded shut such that the back display surface of the display panel comes to rest in a position such that it faces outwardly towards a user, when the bottom surface of the base panel is rested on a surface or held by the user. In the tablet mode of operation, the back display surface performs the role of a display and user interface, as this surface may have touch screen functionality and may perform other known functions of a conventional touch screen device, such as a tablet device. To this end, the display panel may include a transparency-adjusting layer that is disposed between a touch screen layer and a front display surface. In some embodiments the transparency-adjusting layer may be an electrochromic layer (EC), a LCD layer, or a combination of EC and LCD layers.

In various embodiments, the display can be of different sizes, e.g., an 11.6" or a 13.3" screen, and may have a 16:9 aspect ratio, and at least 300 nits brightness. Also the display may be of full high definition (HD) resolution (at least 1920×1080p), be compatible with an embedded display port (eDP), and be a low power panel with panel self refresh.

As to touch screen capabilities, the system may provide for a display multi-touch panel that is multi-touch capacitive and being at least 5 finger capable. And in some embodiments, the display may be 10 finger capable. In one embodiment, the touch screen is accommodated within a damage and scratch-resistant glass and coating (e.g., Gorilla Glass™ or Gorilla Glass 2™) for low friction to reduce "finger burn" and avoid "finger skipping". To provide for an enhanced touch experience and responsiveness, the touch panel, in some implementations, has multi-touch functionality, such as less than 2 frames (30 Hz) per static view during pinch zoom, and single-touch functionality of less than 1 cm per frame (30 Hz) with 200 ms (lag on finger to pointer). The display, in some implementations, supports edge-to-edge glass with a minimal screen bezel that is also flush with the panel surface, and limited IO interference when using multi-touch.

Using the various inertial and environmental sensors present in a platform, many different use cases may be realized. These use cases enable advanced computing operations including perceptual computing and also allow for enhancements with regard to power management/battery life, security, and system responsiveness.

For example, with regard to power management/battery life issues, based at least on part on information from an ambient light sensor, the ambient light conditions in a location of the platform are determined and intensity of the display controlled accordingly. Thus, power consumed in operating the display is reduced in certain light conditions.

As to security operations, based on context information obtained from the sensors such as location information, it may be determined whether a user is allowed to access certain secure documents. For example, a user may be permitted to access such documents at a work place or a home location. However, the user is prevented from accessing such documents when the platform is present at a public location. This determination, in one embodiment, is based on location information, e.g., determined via a GPS sensor or camera recognition of landmarks. Other security operations may include providing for pairing of devices within a close range of each other, e.g., a portable platform as described herein and a user's desktop computer, mobile telephone or so forth. Certain sharing, in some implementations, are realized via near field communication when these devices are so paired. However, when the devices exceed a certain range, such sharing may be disabled. Furthermore, when pairing a platform as described herein and a smartphone, an alarm may be configured to be triggered when the devices move more than a predetermined distance from each other, when in a public location. In contrast, when these paired devices are in a safe location, e.g., a work place or home location, the devices may exceed this predetermined limit without triggering such alarm.

Responsiveness may also be enhanced using the sensor information. For example, even when a platform is in a low power state, the sensors may still be enabled to run at a relatively low frequency. Accordingly, any changes in a location of the platform, e.g., as determined by inertial sensors, GPS sensor, or so forth is determined. If no such changes have been registered, a faster connection to a previous wireless hub such as a Wi-Fi™ access point or similar wireless enabler occurs, as there is no need to scan for available wireless network resources in this case. Thus, a greater level of responsiveness when waking from a low power state is achieved.

It is to be understood that many other use cases may be enabled using sensor information obtained via the integrated sensors within a platform as described herein, and the above examples are only for purposes of illustration. Using a system as described herein, a perceptual computing system may allow for the addition of alternative input modalities, including gesture recognition, and enable the system to sense user operations and intent.

In some embodiments one or more infrared or other heat sensing elements, or any other element for sensing the presence or movement of a user may be present. Such sensing elements may include multiple different elements working together, working in sequence, or both. For example, sensing elements include elements that provide initial sensing, such as light or sound projection, followed by sensing for gesture detection by, for example, an ultrasonic time of flight camera or a patterned light camera.

Also in some embodiments, the system includes a light generator to produce an illuminated line. In some embodiments, this line provides a visual cue regarding a virtual boundary, namely an imaginary or virtual location in space, where action of the user to pass or break through the virtual boundary or plane is interpreted as an intent to engage with the computing system. In some embodiments, the illuminated line may change colors as the computing system transitions into different states with regard to the user. The illuminated line may be used to provide a visual cue for the user of a virtual boundary in space, and may be used by the system to determine transitions in state of the computer with regard to the user, including determining when the user wishes to engage with the computer.

In some embodiments, the computer senses user position and operates to interpret the movement of a hand of the user through the virtual boundary as a gesture indicating an intention of the user to engage with the computer. In some embodiments, upon the user passing through the virtual line or plane the light generated by the light generator may change, thereby providing visual feedback to the user that the user has entered an area for providing gestures to provide input to the computer.

Display screens may provide visual indications of transitions of state of the computing system with regard to a user. In some embodiments, a first screen is provided in a first state in which the presence of a user is sensed by the system, such as through use of one or more of the sensing elements.

In some implementations, the system acts to sense user identity, such as by facial recognition. Here, transition to a second screen may be provided in a second state, in which the computing system has recognized the user identity, where this second the screen provides visual feedback to the user that the user has transitioned into a new state. Transition to a third screen may occur in a third state in which the user has confirmed recognition of the user.

In some embodiments, the computing system may use a transition mechanism to determine a location of a virtual boundary for a user, where the location of the virtual boundary may vary with user and context. The computing system may generate a light, such as an illuminated line, to indicate the virtual boundary for engaging with the system. In some embodiments, the computing system may be in a waiting state, and the light may be produced in a first color. The computing system may detect whether the user has reached past the virtual boundary, such as by sensing the presence and movement of the user using sensing elements.

In some embodiments, if the user has been detected as having crossed the virtual boundary (such as the hands of the user being closer to the computing system than the virtual boundary line), the computing system may transition to a state for receiving gesture inputs from the user, where a mechanism to indicate the transition may include the light indicating the virtual boundary changing to a second color.

In some embodiments, the computing system may then determine whether gesture movement is detected. If gesture movement is detected, the computing system may proceed with a gesture recognition process, which may include the use of data from a gesture data library, which may reside in memory in the computing device or may be otherwise accessed by the computing device.

If a gesture of the user is recognized, the computing system may perform a function in response to the input, and return to receive additional gestures if the user is within the virtual boundary. In some embodiments, if the gesture is not recognized, the computing system may transition into an error state, where a mechanism to indicate the error state may include the light indicating the virtual boundary changing to a third color, with the system returning to receive additional gestures if the user is within the virtual boundary for engaging with the computing system.

As mentioned above, in other embodiments the system can be configured as a convertible tablet system that can be used in at least two different modes, a tablet mode and a notebook mode. The convertible system may have two panels, namely a display panel and a base panel such that in the tablet mode the two panels are disposed in a stack on top of one another. In the tablet mode, the display panel faces outwardly and may provide touch screen functionality as found in conventional tablets. In the notebook mode, the two panels may be arranged in an open clamshell configuration.

In various embodiments, the accelerometer may be a 3-axis accelerometer having data rates of at least 50 Hz. A gyroscope may also be included, which can be a 3-axis gyroscope. In addition, an e-compass/magnetometer may be present. Also, one or more proximity sensors may be provided (e.g., for lid open to sense when a person is in proximity (or not) to the system and adjust power/performance to extend battery life). For some OS's Sensor Fusion capability including the accelerometer, gyroscope, and compass may provide enhanced features. In addition, via a sensor hub having a real-time clock (RTC), a wake from sensors mechanism may be realized to receive sensor input when a remainder of the system is in a low power state.

In some embodiments, an internal lid/display open switch or sensor to indicate when the lid is closed/open, and can be used to place the system into Connected Standby or automatically wake from Connected Standby state. Other system sensors can include ACPI sensors for internal processor, memory, and skin temperature monitoring to enable changes to processor and system operating states based on sensed parameters.

In an embodiment, the OS may be a Microsoft® Windows® 8 OS that implements Connected Standby (also referred to herein as Win8 CS). Windows 8 Connected Standby or another OS having a similar state can provide, via a platform as described herein, very low ultra idle power to enable applications to remain connected, e.g., to a cloud-based location, at very low power consumption. The platform can supports 3 power states, namely screen on (normal); Connected Standby (as a default "off" state); and shutdown (zero watts of power consumption). Thus in the Connected Standby state, the platform is logically on (at minimal power levels) even though the screen is off. In such a platform, power management can be made to be transparent to applications and maintain constant connectivity, in part due to offload technology to enable the lowest powered component to perform an operation.

In a particular implementation, peripheral ports may include a high definition media interface (HDMI) connector (which can be of different form factors such as full size, mini or micro); one or more USB ports, such as full-size external ports in accordance with the Universal Serial Bus Revision 3.0 Specification (November 2008), with at least one powered for charging of USB devices (such as smartphones) when the system is in Connected Standby state and is plugged into AC wall power. In addition, one or more Thunderbolt™ ports can be provided. Other ports may include an externally accessible card reader such as a full size SD-XC card reader and/or a SIM card reader for WWAN (e.g., an 8 pin card reader). For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The following examples pertain to embodiments in accordance with this Specification. One or more embodiments may provide an apparatus, a system, a machine readable storage, a machine readable medium, hardware- and/or software-based logic, and a method to interpret a steering tag value in a data packet header to store data payloads into non-volatile memory.

Example 1 is an apparatus comprising an application processor that includes an interface logic to interface with a communication module using a bidirectional interconnect link compliant with a peripheral component interconnect express (PCIe) protocol. The interface logic is configured to receive a data packet from across the link, the data packet comprises a header and data payload; determine a hint bit set in the header of the data packet; determine a steering tag value in the data packet header based on the hint bit set; and transmit the data payload to non-volatile memory based on the steering tag set in the header.

Example 2 may include the subject matter of example 1, and also include memory controller logic to transmit a write completion message to the interface logic; and further comprising interface logic to receive the write completion for the write access to non-volatile memory from the memory controller logic; receive a read completion request for the write access; transmit a read completion after receiving each write completion from the memory controller logic.

Example 3 may include the subject matter of example 2, and can also include interface logic to delay responding to the read completion message until all prior write completions have been received by the interface logic.

Example 4 may include the subject matter of example 2, and can also include interface logic to receive a plurality of write access requests; and further comprising memory controller logic to perform the plurality of write access requests; and transmit a plurality of write access completion messages to the interface logic.

Example 5 may include the subject matter of example 1-4, wherein the hint bit comprises a transaction layer packet processing hint bit.

Example 6 may include the subject matter of example 1-5, and also include memory controller logic to identify a cache hint from the packet header; and cache the write request prior to performing the write access to the non-volatile memory.

Example 7 may include the subject matter of example 1-6, and also include interface logic to decode the steering tag value to determine that the data payload is to be written to non-volatile memory.

Example 8 may include the subject matter of example 1-7, wherein the interface logic comprises PCIe root port logic.

Example 9 is a method that includes receiving one or more data packets, each data packet comprising a data packet header comprising a hint bit and a steering tag bit, and data payload; determining that the hint bit is set; determining a steering tag value based on determining that the hint bit is set; interpreting the steering tag value to write the data payload into non-volatile memory; and transmitting the data payload to the non-volatile memory based on the steering tag value.

Example 10 may include the subject matter of example 9, wherein the hint bit comprises a transaction layer packet processing hint bit.

Example 11 may include the subject matter of example 9-10, and can also include receiving a flush read completion request for the write access; and transmitting a read completion after receiving a write completion for each write access to the non-volatile memory.

Example 12 may include the subject matter of example 11, and can also include delaying transmitting the read completion until after receiving a write access completion message for each prior write access to non-volatile memory.

Example 13 may include the subject matter of example 9-12, and can also include identifying a caching hint from the packet header; and caching the write request prior to performing the write access to the non-volatile memory.

Example 14 may include the subject matter of example 9-13, and can also include decoding the steering tag value to determine that the write access in the one or more data packets is a write access to non-volatile memory.

Example 15 may include the subject matter of example 9-14, wherein the data packets are received from across a link compatible with a peripheral component interconnect express (PCIe) protocol.

Example 16 may include the subject matter of example 9-15, and can also include identifying an ordering hint from the packet header for ordering the write completions in non-volatile memory; and executing the write accesses in an order different from an order the data packets were received.

Example 17 is at least one machine accessible storage medium having code stored thereon, the code when executed on a machine, causes the machine to receive one or more data packets, each data packet comprising a data packet header comprising a hint bit and a steering tag bit; determine that the hint bit is set; determine a steering tag value; interpret the hint bit set and the steering tag value as a write request to non-volatile memory; and execute a write access to the non-volatile memory based on the steering tag value.

Example 18 may include the subject matter of example 17, wherein the hint bit comprises a transaction layer packet processing hint bit.

Example 19 may include the subject matter of example 17-18, the code when executed on a machine, causes the machine to receive a flush read completion request for the write access; and transmit a read completion after receiving a write completion for each write access to the non-volatile memory.

Example 20 may include the subject matter of example 17-19, the code when executed on a machine, causes the machine to delay transmitting the read completion until after receiving a write access completion message for each prior write access to non-volatile memory.

Example 21 may include the subject matter of example 17-19, the code when executed on a machine, causes the machine to identify a cache hint from a packet header; and cache the write request prior to performing the write access to the non-volatile memory.

Example 22 may include the subject matter of example 17-19, the code when executed on a machine, causes the machine to decode the steering tag value to determine that the write access in the one or more data packets is a write access to non-volatile memory.

Example 23 may include the subject matter of example 17-19, wherein the data packets are received from across a link compatible with a peripheral component interconnect express (PCIe) protocol.

Example 24 may include the subject matter of example 17-19, the code when executed on a machine, causes the machine to identify an ordering hint from the packet header for ordering the write completions in non-volatile memory; and execute the write accesses in an order different from an order the data packets were received.

Example 25 is a system comprising an interface controller to receive a packet from an input/output device; a central processing unit comprising root complex logic, the root complex logic to receive a data packet from across the link; determine a hint bit set in a header of the data packet; determine a steering tag value in the data packet header; and transmit the write access to non-volatile memory and data from the data packet to a memory controller.

Example 26 may include the subject matter of example 25, and also include memory controller logic to transmit a write completion message to the interface logic. Example 26 can also include interface logic to receive the write completion for the write access to non-volatile memory from the memory controller logic; receive a read completion request for the write access; transmit a read completion after receiving each write completion from the memory controller logic.

Example 27 may include the subject matter of example 26, and can also include interface logic to delay responding to the read completion message until all write completions have been received by the interface logic.

Example 28 may include the subject matter of example 27, and can also include interface logic to receive a plurality of write access requests. The example can also include memory controller logic to perform the plurality of write access requests; and transmit a plurality of write access completion messages to the interface logic.

Example 29 may include the subject matter of example 25-28, wherein the hint bit comprises a transaction layer packet processing hint bit.

Example 30 may include the subject matter of example 25-29, and can also include memory controller logic to identify a cache hint from the packet header; and cache the write request prior to performing the write access to the non-volatile memory.

Example 31 may include the subject matter of example 25-30, and can also include interface logic to decode the steering tag value to determine that the write access is a write access to non-volatile memory.

Example 32 may include the subject matter of example 25-31, wherein the interface logic comprises PCIe root port logic.

Example 33 may include the subject matter of example 1, further including interface logic to augment an outbound packet header of a packet with a steering tag value identifying that the packet includes a write transaction for non-volatile memory.

Example 34 may include the subject matter of example 9, and can also include augmenting an output packet header of a packet with a steering tag value identifying that the packet includes a write transaction for non-volatile memory.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
a root complex;
an application processor comprising:
an interface logic to interface with a communication module using a bidirectional interconnect link compliant with a peripheral component interconnect express (PCIe) protocol, the interface logic to:
receive a data packet from a device from across the link, the data packet comprises a header and data payload;
determine a hint bit set in the header of the data packet, the hint bit set to indicate that transaction layer processing hints (TPH) are active and to direct the root complex to decode a steering tag value in the header;
determine the steering tag value in the data packet header based on the hint bit set, the steering tag value to indicate a write transaction to non-volatile memory; and
transmit the data payload to non-volatile memory based on the determined steering tag value in the header;
the root complex to:
send a write completion to the device; and
receive a flushing read from the device, the flushing read to trigger a read completion, the read completion to indicate a confirmation that the write to non-volatile memory is complete.

2. The apparatus of claim 1, further comprising memory controller logic to:
transmit a write completion message to the interface logic; and further comprising interface logic to:
receive the write completion for the written data to non-volatile memory from the memory controller logic;
receive a read completion request for the written data;
transmit a read completion after receiving each write completion from the memory controller logic.

3. The apparatus of claim 2, further comprising interface logic to delay responding to the read completion message until all prior write completions have been received by the interface logic.

4. The apparatus of claim 2, further comprising interface logic to:
receive a plurality of data write requests; and
further comprising memory controller logic to:
perform the plurality of data write requests; and
transmit a plurality of data write completion messages to the interface logic.

5. The apparatus of claim 1, wherein the hint bit comprises a transaction layer packet processing hint bit.

6. The apparatus of claim 1, further comprising memory controller logic to:
identify a cache hint from the packet header; and
cache the write request prior to performing the write access to the non-volatile memory.

7. The apparatus of claim 1, further comprising interface logic to decode the steering tag value to determine that the data is to be written to non-volatile memory.

8. The apparatus of claim 1, wherein the interface logic comprises PCIe root port logic.

9. A method comprising:
receiving at a root complex one or more data packets from a device connected to the root complex by a link, each data packet comprising a data packet header comprising a hint bit and a steering tag bit, and data payload;

determining that the hint bit is set, the hint bit set to indicate to the root complex to read the steering tag value;

determining a steering tag value based on determining that the hint bit is set;

interpreting the steering tag value as an indication to write the data payload into non-volatile memory;

transmitting the data payload to the non-volatile memory based on the steering tag value;

sending a write completion to the device; and receiving a flushing read from the device, the flushing read trigger a read completion to indicate a write completion of the data payload to non-volatile memory.

10. The method of claim 9, wherein the hint bit comprises a transaction layer packet processing hint bit.

11. The method of claim 9, further comprising:
receiving a flush read completion request for the write access; and
transmitting a read completion after receiving a write completion for each write access to the non-volatile memory.

12. The method of claim 11, further comprising delaying transmitting the read completion until after receiving a write access completion message for each prior write access to non-volatile memory.

13. The method of claim 9, further comprising:
identifying a caching hint from the packet header; and
caching the write request prior to performing the write access to the non-volatile memory.

14. The method of claim 9, further comprising decoding the steering tag value to determine that the write access in the one or more data packets is a write access to non-volatile memory.

15. The method of claim 9, wherein the data packets are received from across a link compatible with a peripheral component interconnect express (PCIe) protocol.

16. The method of claim 9, further comprising:
identifying an ordering hint from the packet header for ordering the write completions in non-volatile memory; and
executing the write accesses in an order different from an order the data packets were received.

17. At least one machine accessible storage medium having code stored thereon, the code when executed on a machine, causes the machine to:
receive one or more data packets from a device across a link, each data packet comprising a data packet header comprising a hint bit and a steering tag bit, the data packet comprising a data payload;
determine that the hint bit is set, the hint bit set to indicate that the steering tag bit is to be decoded;
determine a steering tag value based on the hint bit being set;
interpret the hint bit set and the steering tag value as a write request to non-volatile memory;
execute a write access to the non-volatile memory based on the steering tag value;
send a write completion to the device; and
receive a flushing read from the device, the flushing read trigger a read completion to indicate a write completion of the data payload to non-volatile memory.

18. The least one machine accessible storage medium of claim 17, wherein the hint bit comprises a transaction layer packet processing hint bit.

19. The least one machine accessible storage medium of claim 17, the code when executed on a machine, causes the machine to:
receive a flush read completion request for the write access; and
transmit a read completion after receiving a write completion for each write access to the non-volatile memory.

20. The least one machine accessible storage medium of claim 17, the code when executed on a machine, causes the machine to delay transmitting the read completion until after receiving a write access completion message for each prior write access to non-volatile memory.

* * * * *